US 9,965,826 B2

(12) United States Patent
Zhao

(10) Patent No.: US 9,965,826 B2
(45) Date of Patent: May 8, 2018

(54) RESOURCE MANAGEMENT

(71) Applicant: Alibaba Group Holding Limited, George Town, Grand Cayman (KY)

(72) Inventor: Yongke Zhao, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days. days.

(21) Appl. No.: 15/017,070

(22) Filed: Feb. 5, 2016

(65) Prior Publication Data

US 2016/0232640 A1  Aug. 11, 2016

(30) Foreign Application Priority Data

Feb. 10, 2015  (CN) .......................... 2015 1 0069338

(51) Int. Cl.
*G06T 13/00* (2011.01)
*G06T 1/20* (2006.01)
*G06F 9/50* (2006.01)

(52) U.S. Cl.
CPC .................. *G06T 1/20* (2013.01); *G06F 9/50* (2013.01); *G06T 2200/28* (2013.01)

(58) Field of Classification Search
CPC ........ G06F 9/50; G06F 9/5077; G06F 9/5027; G06F 9/545; G06F 2209/504; G06F 9/5011; G06F 9/5044; G06T 2200/28
See application file for complete search history.

(56) References Cited

U.S. PATENT DOCUMENTS

| 8,479,198 | B2 | 7/2013 | Hayakawa et al. |
|---|---|---|---|
| 8,555,267 | B2 | 10/2013 | Makarov |
| 8,595,721 | B2 | 11/2013 | Nayar et al. |
| 8,627,040 | B2 | 1/2014 | Koka et al. |
| 8,667,500 | B1 | 3/2014 | Ji et al. |
| 8,683,120 | B2 | 3/2014 | Hayashi |
| 8,707,300 | B2 | 4/2014 | Govindan et al. |
| 8,719,839 | B2 | 5/2014 | Yan et al. |
| 8,725,921 | B2 | 5/2014 | Takeuchi |
| 8,762,665 | B2 | 6/2014 | Satou et al. |
| 8,766,996 | B2 | 7/2014 | Du et al. |
| 8,819,230 | B2 | 8/2014 | Nahum et al. |
| 8,826,270 | B1 | 9/2014 | Lewis et al. |
| 8,838,913 | B1 | 9/2014 | Conover |
| 8,935,484 | B2 | 1/2015 | Chang et al. |
| 8,935,501 | B2 | 1/2015 | Shigeta |
| 8,943,512 | B2 | 1/2015 | Hanquez et al. |

(Continued)

FOREIGN PATENT DOCUMENTS

WO   2012083012   6/2012

*Primary Examiner* — Hau Nguyen

(57) ABSTRACT

Embodiments of the present invention provide resource managing methods and systems. The method comprises: receiving a request to allocate resources sent from host code of an application program located on a first device; in accordance with the allocation request and a maintained mapping logic mapping available hardware resources of at least one graphics processing unit (GPU) of the first device to a unified virtual GPU resource, allocating required resources for a device code of the application program from the available hardware resources of at least one GPU of the first device; and forwarding information of the allocated resource back to the host code. The present invention can efficiently utilize GPU resources and reduce implementation costs.

20 Claims, 3 Drawing Sheets

Multiple Graphics Processing Units

(56) References Cited

U.S. PATENT DOCUMENTS

| | | |
|---|---|---|
| 8,990,807 B2 | 3/2015 | Wu et al. |
| 9,015,523 B2 | 4/2015 | Chahal et al. |
| 9,024,959 B2 | 5/2015 | Duprat et al. |
| 9,037,512 B2 | 5/2015 | Guo |
| 9,052,932 B2 | 6/2015 | Anand et al. |
| 9,081,504 B2 | 7/2015 | Balakrishnan et al. |
| 9,081,618 B2 | 7/2015 | Kiehn |
| 9,081,621 B2 | 7/2015 | Fahrig |
| 9,112,685 B2 | 8/2015 | Gage et al. |
| 9,141,431 B1 | 9/2015 | Godunov et al. |
| 9,142,004 B2 * | 9/2015 | Abiezzi ............... G06T 1/20 |
| 9,158,569 B2 | 10/2015 | Mitra et al. |
| 9,164,809 B2 | 10/2015 | Tsirkin et al. |
| 9,164,923 B2 | 10/2015 | Sheaffer et al. |
| 9,229,751 B2 | 1/2016 | Yoo et al. |
| 9,237,131 B2 | 1/2016 | Nahum et al. |
| 9,251,108 B2 | 2/2016 | Bass et al. |
| 9,491,112 B1 * | 11/2016 | Patel ............... H04L 47/70 |
| 2005/0168472 A1 | 8/2005 | Gosalia et al. |
| 2006/0146057 A1 | 7/2006 | Blythe |
| 2010/0295859 A1 * | 11/2010 | Stauffer ............ G06F 9/5016 |
| | | 345/531 |
| 2011/0202706 A1 | 8/2011 | Moon et al. |
| 2012/0011347 A1 | 1/2012 | Little et al. |
| 2012/0254868 A1 | 10/2012 | Hansson et al. |
| 2013/0021353 A1 | 1/2013 | Drebin et al. |
| 2013/0091500 A1 | 4/2013 | Earl et al. |
| 2014/0181806 A1 | 6/2014 | Abiezzi et al. |
| 2015/0009222 A1 | 1/2015 | Diard et al. |

\* cited by examiner

Multiple Graphics Processing Units

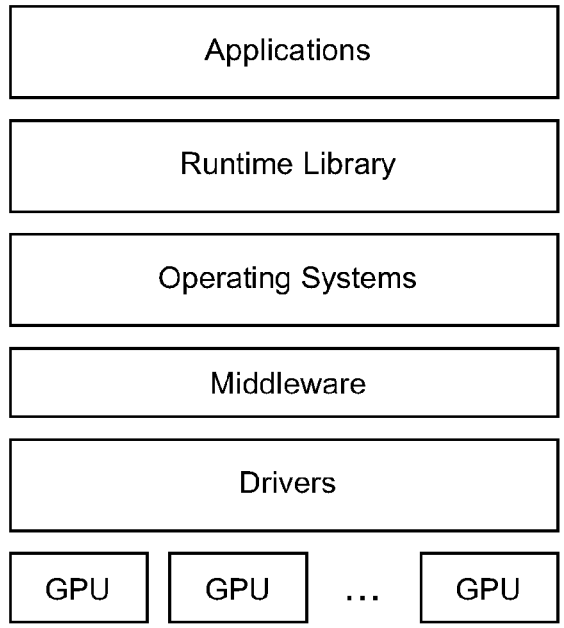

Receive a request to allocate resources sent from a host code of an application program located on a first device
401

Allocate, in accordance with the allocation request and maintained mapping logic of mapping available hardware resources of at least one GPU of the first device to a unified virtual GPU resource, required resources for a device code of the application program from the available hardware resources of at least one GPU of the first device
402

Forward information of the allocated resource back to the host code
403

FIG. 4

RESOURCE MANAGEMENT

This application claims priority to Chinese Patent Application No. 201510069338.7, filed on Feb. 10, 2015, which is incorporated herein by reference in its entirety.

TECHNICAL FIELD

Embodiments according to the present disclosure relate generally to the field of software technology and, more particularly, to a method and apparatus for resource management.

BACKGROUND

With a constant increase in data volume and computing scale, more and more application programs are choosing to use graphics processing units (GPU) for computational resources. During the process of using a GPU, an operating system is responsible for obtaining low-level GPU hardware details and providing those low-level GPU hardware details to an application program. The application program determines the required GPU resources and requests the required GPU resources from the GPU according to the low-level GPU hardware details.

Some video card manufacturers, such as NVIDIA and AMD, continually release GPUs with new structures for the purpose of increasing video card efficiency. However, the capacities of the newly released video cards are usually so small that a single video card is incapable of meeting the increasing needs of the computational requirements. When there is a need to further improve computational capabilities, coordinative computing by multiple GPUs is usually selected as the compute mode. One of the most common modes is to use one computer with multiple GPUs to coordinate computing large amounts of data.

Since the GPU-based application programs on the market are designed to run on hardware with a single GPU card, programmers need to redesign application programs in order for them run on the hardware structures incorporated within multiple GPUs. These new application programs need to be capable of using hardware resources based on the details of the low level hardware, such as, the video memory capacities, the number of computing units, and the number of GPUs to accommodate the hardware structures of multiple GPUs. Moreover, the application programs need to be redesigned with respect to the different structures of a computer having multiple GPUs. Even though GPU resources can be used more efficiently when there is a specific application program for respective hardware structures, there is a significant cost to have a specific design maintained for each of the hardware structures.

SUMMARY OF INVENTION

The present disclosure overcomes the deficiencies described above by providing a technique to avoid redesigning the application programs and to reduce the cost associated with application development. Embodiments of the present disclosure include a method and apparatus for resource management that uses GPU resources more efficiently and reduces costs.

An embodiment comprises a method including receiving a request to allocate resources sent from host code of an application program located on a first device. The method also includes allocating resources for device code of the application program from available hardware resources of at least one GPU of the first device in accordance with 1) the allocation request and 2) a maintained mapping logic mapping the available hardware resources of at least one GPU of the first device to a unified virtual GPU resource. The method further includes forwarding the information of the allocated resource back to the host code to enable the host code to control the device code to use the allocated resource to run on at least one GPU.

Another embodiment comprises a device for managing resources that includes a receiving module configured to receive a request to allocate resources sent from host code of an application program on a first device. The device also includes an allocating module configured to allocate required resources for device code of the application program from available hardware resources of at least one GPU of the first device in accordance with the allocation request and further configured to maintain mapping logic mapping the available hardware resources of at least one GPU of the first device to a unified virtual GPU resource. The device further includes a sending module configured to forward information of the allocated resource back to the host in order to enable the host code to control the device code, and allowing the device code to run on at least one GPU based on the allocated resource.

Embodiments of the present disclosure maintain mapping logic between a GPU and an application program that maps the available hardware resources of at least one GPU of the first device to a unified virtual GPU resource. The available hardware resources provided by the at least one GPU of the first device can be presented to the application program in the form of a unified virtual GPU resource by use of mapping logic. Specifically, when a request to allocate resources sent from host code is received, according to 1) the allocation request and 2) the maintained mapping logic mapping the available hardware resources of at least one GPU of the first device to a unified virtual GPU resource, resources are selected from the available hardware resources of at least one GPU to be allocated for device code of the application program and then provided to the host code. When receiving the resources, the host code can control the device code and have the device code run on the GPU based on the required resources. The method of the present disclosure implements a separation between the application program and the details of the low level GPU hardware, in addition to maintaining effective use of GPU resources. As the application programs do not need to take the details of the low level hardware into account, there is advantageously no need to redesign the application programs. Compared with the conventional techniques, the techniques of the embodiments of the present disclosure reduce costs, e.g., associated with redesigning an application.

BRIEF DESCRIPTION OF THE DRAWINGS

Embodiments of the present disclosure will be better understood from a reading of the following detailed description, taken in conjunction with the accompanying figures, in which like reference characters designate like elements and in which:

FIG. 3 is a block diagram of a second multi-level structure, from the low level hardware to an upper level application program in accordance with an embodiment.

FIG. 4 is a flowchart of an exemplary method for managing resources in accordance with an embodiment.

DETAILED DESCRIPTION

Reference will now be made in detail to the embodiments of the present invention. While the invention will be described in conjunction with these embodiments, it will be understood that they are not intended to limit the invention to these embodiments. On the contrary, the invention is intended to cover alternatives, modifications, and equivalents which may be included within the spirit and scope of the invention as defined by the appended claims. It will be apparent from the foregoing disclosure to those skilled in the art that variations and modifications of such embodiments and methods may be made without departing from the spirit and scope of the invention.

Figure 1:
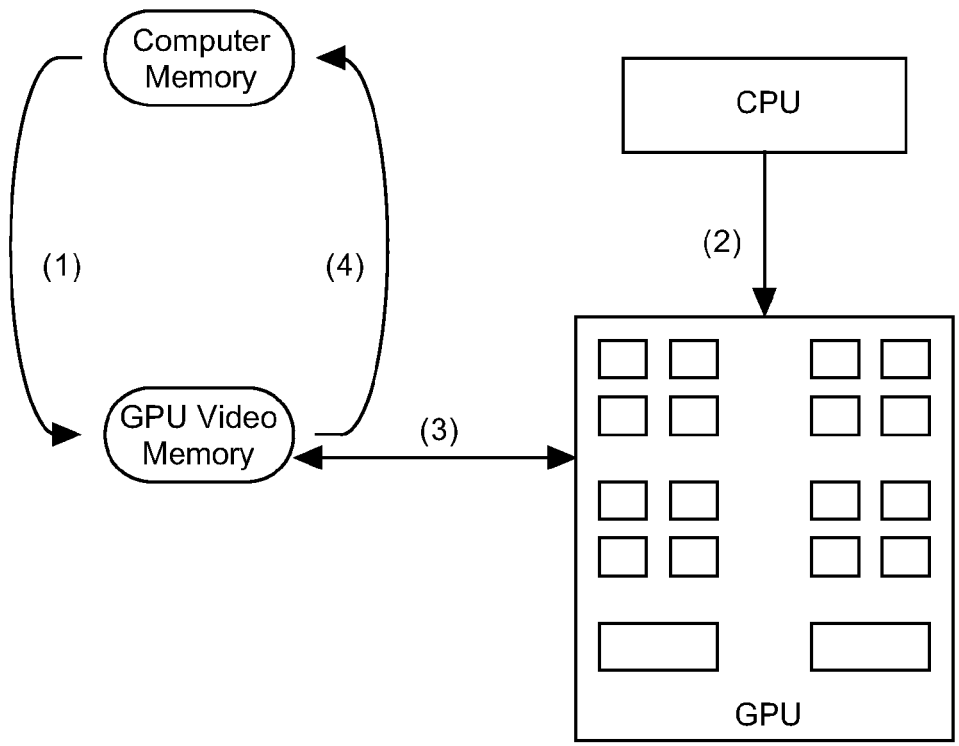
FIG. 1 is an exemplary flow diagram of a GPU-based computing application program in accordance with an embodiment.

A GPU-based computing application program includes host code and device code. The host code is executed on a CPU (central processing unit) and the device code, which is also referred to as a kernel function, is executed on a GPU. FIG. 1 illustrates an exemplary flow diagram of a GPU-based computing application program that includes:

(1) Copying, under the control of a CPU, data for processing from a computer memory to a GPU video memory;

(2) The CPU sending a device code to the GPU;

(3) Multiple processors in the GPU executing the device code using the data in the video memory. This can include the GPU reading and writing video memory data repeatedly during the computing process and storing computing results of the device code in the video memory; and (4) Copying the computing results in the video memory to the computer memory under the control of the CPU.

The current GPU-based application programs are designed for single GPU-based systems. The process described above is suitable for the scenarios in which a single GPU-based hardware system is utilized. Programmers need to redesign application programs to accommodate the hardware structure of a computer with multiple GPU cards and to use hardware resources based on the details of the low level hardware of the computer with multiple GPU cards, such as video memory capacities, the number of computing units and the number of GPU cards. However, generally the cost to redesign the application program is high.

Addressing the issues explained above, the present disclosure includes a method for resource management. By using this method, a GPU-based computing application program can be executed on devices containing GPU cards and CPUs without taking the details of the low level hardware into account or redesigning application programs. The method, in accordance with the present invention, uses GPU resources effectively and reduces the cost.

Before presenting a method of the present disclosure, an operating environment will be described herein. For ease of description, a device containing both GPU cards and one or more CPUs will be referred to as the first device. The first device can be any device including a combination of a computer with multiple GPU cards, which means that there is at least one CPU card associated with the first device accompanying the GPUs.

Figure 2:
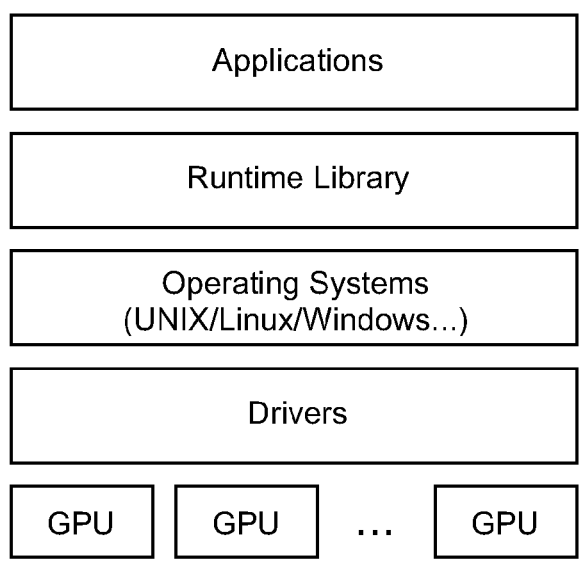
FIG. 2 is a block diagram of a first multi-level structure, from the low level hardware to an upper level application program in accordance with an embodiment.

In the field of computer technology, there are multiple levels or layers from the low level hardware to an upper level application program. FIG. 2 illustrates one of the commonly used multi-level structures, including at least one GPU, drivers, an operating system, a runtime library, and application programs.

Drivers are modules designed specifically to communicate with hardware devices that are usually provided by hardware manufactures (e.g., NVIDIA and AMD GPU drivers are provided by NVIDIA and AMD respectively). Drivers provide software interfaces for hardware devices to support the operating system. An operating system possesses the capability to manage resources and allocate resources for multiple users and processes to prevent competition between the users or the processes. The upper level above the operating system is a runtime library provided for the application programs for the users to communicate with the low level hardware through appointed ports to prevent unauthorized hardware access by users.

In order to support the operation method in the present disclosure, a virtual middleware is introduced to the multi-level structures presented in FIG. 2. The virtual middleware is used to map available hardware resources of at least one GPU to a unified virtual GPU resource, which can also be interpreted as mapping the hardware resources to resources on a virtual GPU for further processing. The virtual middleware is also used to maintain the mapping logic which provides mapping of the available hardware resources of at least one GPU to a unified virtual GPU resource to avoid the process of redesigning application programs. This enables application programs to be used on a device that combines a computer and multiple GPU cards in order to reduce costs associated with application programs.

It should be noted that the virtual middleware can be placed between any two levels to implement embodiments of the present invention. FIG. 3 illustrates that the virtual middleware is placed between the drivers and the operating system and has a high efficiency when incorporated in such a structure. In an embodiment with such a structure, the virtual middleware manages the low level hardware directly by using the drivers to map at least one GPU to a virtual GPU. The middleware can also be placed between the operating system and the runtime library or between the runtime library and the application programs.

It should be noted that the virtual middleware can be embodied as the resource management device in subsequent embodiments.

FIG. 4 is a flowchart of an exemplary method for resource management. In step 401, a request to allocate resources is sent from a host code of an application on a first device. In step 402, resources are allocated for a device code of the application program from the available hardware resources of at least one GPU on the first device in accordance with the allocation request and mapping logic is maintained that maps available hardware resources of at least one GPU on the first device to a unified virtual GPU resource. In step 403, the allocated resources are forwarded back to the host code.

According to an embodiment, a resource management device implements the method for managing resources. The resource management device is located on the first device between the GPUs and application programs and maintains the mapping logic (mapping the available hardware resources of at least one GPU of the first device to a unified virtual GPU resource). The resource management device is in charge of managing and dispatching GPU resources and implementing communication between the application programs and the low level GPU hardware. The resource management device can be embodied as the virtual middleware in FIG. 3.

According to an embodiment, a kernel layer or a driver layer of the operating system can execute the method above, meaning that the virtual middleware can also be embedded between the operating system and the driver layer in order to implement resource management. Specifically, the host code of the application program runs on the CPU of the first device. The host code sends requests to allocate resources to the resource management device or, alternatively, the CPU that runs the host code sends requests to allocate resources to the resource management device. The resource management device receives the requests to allocate resources from the host code and allocates resources for a device code of the application program from available hardware resources of at least one GPU of the first device according to the allocation requests and maintains mapping logic (mapping the available hardware resources of at least one GPU of the first device to the unified virtual GPU resource). The allocated resources are then provided to the host code. In this way, the host code can control the device code and have the device code run on the GPU based on the allocated resources.

It should be noted that the allocation requests can include information such as types and quantities of required resources. The resource management device allocates resources, such as the types and amounts requested for the device code, according to the information of the allocation requests.

The main function of the mapping logic mapping the available hardware resources of at least one GPU of the first device to the unified virtual GPU resource is to map the available hardware resources of at least one GPU of the first device to a virtual GPU resource. In this way, from an exterior perspective, what is observed is one virtual GPU resource instead of the available hardware resources of a GPU. Correspondingly, according to the mapping logic, the process of allocating of resources for the device code of the application program from the available hardware resources of at least one GPU of the first device allocates resources for the device code according to the unified virtual GPU resource.

An embodiment includes a method that maintains the mapping logic between the GPU and the application program that maps the available hardware resources of at least one GPU of the first device to the unified virtual GPU resource, so that the available hardware resources of at least one GPU of the first device are presented to the application program in the form of a unified virtual GPU resource. The method uses the mapping logic to allocate resources for the device code running on the GPU of the application program, which implements a separation between the application program and the details of the low level GPU hardware. The application program no longer needs to take the details of the low level GPU hardware into account or determine and allocate GPU resources. Hence, the process and logic embodying the execution of the device code can be designed to be used by a single GPU card instead of being designed to additionally meet the requirements embodying interactions between multiple GPU cards in different scenarios. This avoids the need to redesign the application programs and, more specifically, avoids the need to redesign the logic for the execution of the device code in the application programs. By using this method, the GPU resources will be used more effectively and at a lower cost. Moreover, the method in accordance with the present invention extends the scale of using small capacity GPUs, releases the manufactures from developing GPUs with larger capacities, and also reduces application development costs. The method allows freedom from the restrictions of the low level hardware details and has portability that can be transferred to different structures.

In an embodiment, in order to manage and dispatch the hardware resources provided by the GPU, before allocating resources for the application program from the available hardware resources of the GPU, the resource management device obtains, in advance, details of the hardware resources, also referred to as resource details. The resource details are provided by each of the GPUs of a set of GPUs and the resource management device generates the mapping logic mapping available hardware resources of at least one GPU to a unified virtual GPU resource mapped in accordance with the resource details of each GPU. The resource details are used to describe the available hardware resources of the GPU. For example, the resource details can include types, quantities, working conditions of the hardware resources, etc. In this embodiment, the available hardware resources of each GPU can include, but are not limited to, video memory resources and computational resources. The details of the video memory resource can include a type identifier used to identify a video memory resource, a capacity of video memory, availability of video memory, etc. The details of a computational resource can include a type identifier used to identify a computational resource, a quantity of the resources, working conditions of the resources, etc.

The resource management device sends a request to obtain resource details to each of the GPUs of the set of GPUs and receive resource details forwarded back from each GPU in response to the request. Optionally, before sending the requests to obtain resource details to the GPUs, the resource management device monitors the initialization of the first device to detect the GPUs. Another way to obtain resource details is to let the resource management device receive registration requests including resource details sent from each of the GPUs of the set of GPUs and extract resource details from the registration requests. For example, each GPU can proactively register with the resource management device after the initialization of the first device so that the resource management device receives resource details and manages the GPUs according to the resource details.

In another embodiment, the available hardware resources of at least one GPU include video memory resources and computational resources. Based on this, the resource management device can access, in accordance with the allocation requests, the maintained mapping logic mapping the available hardware resources of at least one GPU of the first device to the unified virtual GPU resource, and the resource management device can allocate requested computational resources from the computational resources and allocated requested video memory resources from the video memory resources for the device code, according to the mapping logic. For ease of description, the computational resource allocated to the device code will be referred to as the first computational resource and the video memory resource allocated to the device code as the first video memory resource.

Since the video memory resources are mainly used to provide application programs with access to data, the resource management device can provide for a virtual memory having an identical amount of resources as the total amount of the available video memory resources of at least one GPU from the system memory of the first device according to the mapping logic (mapping the available hardware resources of at least one GPU of the first device to the unified virtual GPU resource). The resource management device can map the virtual memory with the available video memory resource of at least one GPU to generate a mapping relation between the two. Based on the foregoing, the process of the resource management device allocating the first video memory resources for the device code from the available hardware resources of at least one GPU according to the mapping logic can include the following: allocating a first storage resource for the device code from the virtual memory and identifying a first video memory resource corresponding to the first storage resource according to the mapping logic to identify the first video memory resource allocated to the device of the application program. Optionally, the mapping relation between the virtual memory and the available hardware resources of at least one GPU can be embodied in a specific way by mapping the addresses of the virtual memory and the video memory resource.

Figure 5:
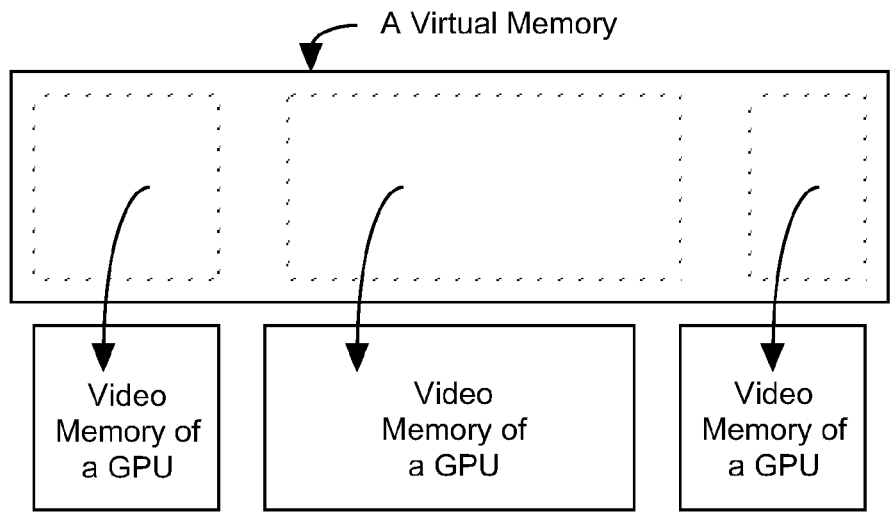
FIG. 5 is a diagram of an exemplary mapping between a virtual memory and a video memory resource in accordance with an embodiment.

FIG. 5 illustrates a mapping relation between the virtual memory and the available hardware resources of at least one GPU.

In an embodiment, the resource management device can flexibly allocate resources for application programs according to the usage of computational resources. For example, when the computational resources are constrained, the resource management device can prioritize the allocation of computational resources for application programs that have high priority and high real-time requirements to let those application programs receive computational resources from the GPU first. The resource management device can also postpone the allocation of computational resources for application programs that have intense input/output (I/O) performance and low efficiency. Specifically, the resource management device can determine the sequencing to allocate computational resources for the device code of the application programs according to the priorities of the requests to allocate resources. The resource management device can also allocate the first computational resource for the device code of the application programs from the available computational resources of at least one GPU according to the mapping logic mapping the available hardware resources of at least one GPU to the unified virtual GPU resource.

The priorities of the requests to allocate resources can be determined according to the resource requirements and the scenarios of the applications such as the application's requirements for intensity of I/O performance and real-time performance.

In the foregoing embodiment, the resource management device can apply for virtual memory from the system memory, which acts as a virtual GPU having enough storage resources from the perspective of the application programs. The application programs no longer need to take into consideration the details of the low level hardware, including the capacities of the video memories or the number of the GPU cards. By using the mapping logic, the resource management device automatically manages requests between the application programs and the bottom GPU hardware resources. Thus there is no need to redesign application programs, which simplifies the developing, dispatching, and maintaining work and thereby reduces costs.

Furthermore, after the resource management device allocates resources for the device code of the application programs, the allocated resources can be sent to the host code of the application program to enable the host code to control the device code and have the device code run on the GPU. Specifically, the resource management device can send an identifier of the first computational resource and addresses of the first storage resource to the host code. The host code can then send the device code to the first computational resource to have the first computational resource run the device code and, in the meantime, save data produced from running the device code to the first storage resource. The resource management device can save the data produced from running the device code to the identified first video memory resource that corresponds to the first storage resource. It should be noted that, for the application program, the first storage resource in the foregoing is actually virtual memory and the address of the first storage resource is the address of the virtual memory.

After obtaining the allocated first storage resource, the host code of the application program can access the first storage resource, such as requesting to write data to the first storage resource and read data from the first storage resource. Based on this fact, the resource management device can receive read requests sent from the host code to read data from the first storage device and forward the read data back to the host code. Alternatively, the resource management device can receive write requests sent from the host code to write data to the first storage device and synchronize the first video memory resource with the written data in accordance with the identification of the first video memory resource, thereby maintaining its correspondence with the first storage resource. It should be noted that the read requests in the foregoing usually carry the address information of the first storage resource to indicate the location to read data from. The write requests also typically carry the address information of the first storage resource to indicate the location to write data to as well as information regarding what is to be written, such as the data to be written or a storage path for the data to be written.

During the process of the application program using storage resources, the resource management device may synchronize data between the virtual memory and the available video memory resources. The synchronization of a single segment of data is difficult to achieve and expensive; therefore, a full synchronization is adopted to synchronize all of the data in the video memory resource of the whole GPU card with the data in the virtual memory corresponding to that GPU. This full synchronization causes a significant delay, goes against the computing potential of the GPU, and significantly reduces the efficiency and performance of the resource management device.

Addressing the issues mentioned above, the resource management device uses paging to manage resources. When generating the mapping relation between the virtual memory and the available video memory resources of at least one GPU, the resource management device pages the virtual memory to obtain a memory page, pages the video memory resource to obtain a video memory page, and maps the memory page with the video memory page to obtain a mapping relation between the two.

Based on the description in the foregoing, the process of the resource management device synchronously writing the data of the first storage resource to the first memory resource can be specifically interpreted as determining the memory page where the write data is to be located, which will be referred to as the first memory page for ease of description, and synchronizing the data on that first memory page to the first video memory page corresponding with the first memory page.

The resource management device thereby only needs to synchronize the data in one page by using the page management instead of synchronizing all of the data, which is beneficial as it reduces the amount of data interactions between the virtual memory and the video memory resource, thereby further decreasing the delay of memory access and enabling the full computing potential of the GPU. Thus, this method reduces the processing burden of the resource management device and also improves its efficiency.

It should be noted that, for ease of description, the embodiments in the foregoing are presented in a manner of combinations of a series of actions and procedures; however, those skilled in the art should acknowledge that the present disclosure should not be limited by the orders of the actions or procedures. According to the present disclosure, some of the procedures can be embodied in different sequences or simultaneously. Moreover, those skilled in the art should know that the embodiments of the present disclosure are preferred embodiments; however, related actions and procedures are not required to embody the present disclosure. For the parts not explained in detail in certain embodiments, related descriptions can be cross-referenced.

Figure 6:
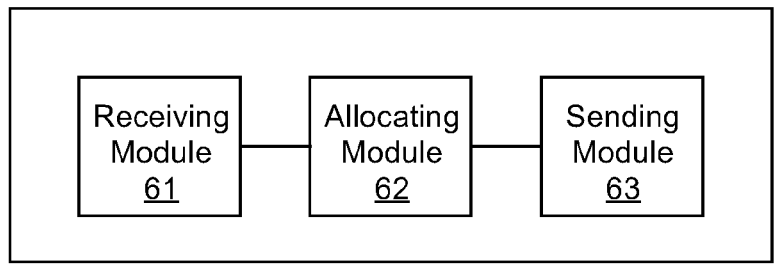
FIG. 6 is a block diagram of an apparatus for managing resources in accordance with an embodiment.

FIG. 6 illustrates a block diagram of a resource management device according to an embodiment, including receiving module 61, allocating module 62, and sending module 63. Receiving module 61 is configured to receive the request to allocate resources sent from the host code of the application program on the first device. Allocating module 62 is configured to allocate resources, according to the request received by module 61, for the device code of the application program from the available hardware resources of at least one GPU of the first device, in accordance with the maintained mapping logic (mapping the available hardware resources of at least one GPU of the first device to the unified virtual GPU resource). Sending module 63 is configured to forward the information from the resources allocated by allocating module 62 back to the host code. The host code can then control the device code to run on at least one GPU based on the allocated resources.

Figure 7:
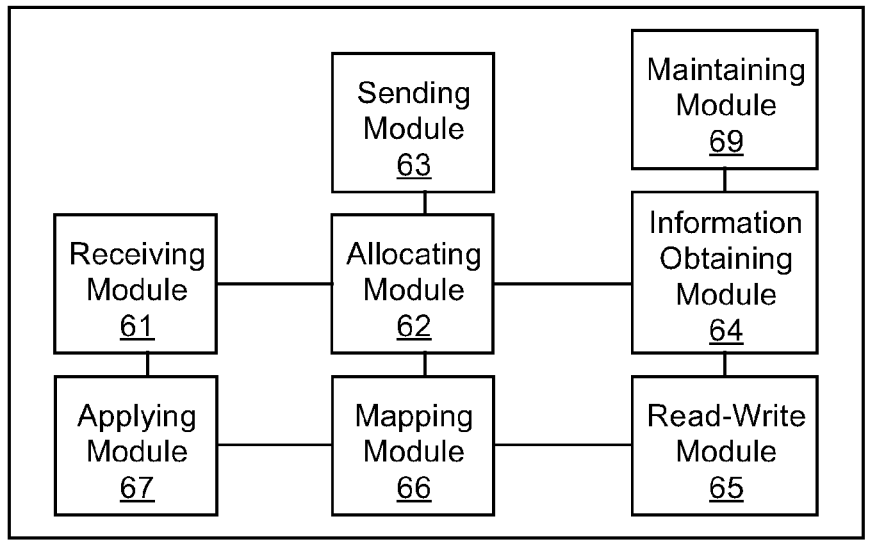
FIG. 7 is a block diagram of an apparatus for managing resources in accordance with an embodiment.

FIG. 7 illustrates a block diagram of a resource management device of an embodiment, including information obtaining module 64 and maintaining module 69. Information obtaining module 64 is configured to send requests to obtain resource details to each of the GPUs of a set of GPUs and receive resource details forwarded back from each of the GPUs based on the requests. Information obtaining module 64 can also be configured to receive registration requests sent from each of the GPUs of the set of GPUs. The registration requests contain resource details, which are used to describe the available hardware resources that each GPU can provide. Maintaining module 69 is configured to generate mapping logic mapping the available hardware resources of at least one GPU to the unified virtual GPU resource according to the resource details of each of the GPUs obtained by information obtaining module 64.

In an embodiment, the available hardware resources of at least one GPU include video memory resources and computational resources. Allocating module 62 is specifically configured to read the mapping logic mapping the available hardware resources of at least one GPU to the unified virtual GPU resource according to the allocation requests. Based on that mapping logic, allocating module 62 allocates the first computational resource for the device code from the computational resources and the first video memory resource for the device code from the video memory resources.

In an embodiment, as illustrated in FIG. 7, the resource management device also includes applying module 65 and mapping module 66. Applying module 65 is configured to manage a virtual memory that possesses a total amount of resources identical to the available video memory resources of at least one GPU from the system memory of the first device according to the mapping logic mapping the available hardware resources of at least one GPU to the unified virtual GPU resource. Mapping module 66 is configured to generate the mapping logic between the virtual memory is managed by the applying module 65 and the available video memory resources of at least one GPU.

In accordance with the foregoing, allocating module 62 is specifically configured to allocate the first computational resource for the device code from the computational resources and the first storage resource for the device code from the virtual memory; it is also used to mark the first video memory resource corresponding to the first storage resource according to the mapping relation generated by mapping module 66 to identify the first video memory resource allocated to the device code.

In an embodiment, as illustrated in FIG. 7, the resource management device also includes read-write module 67. Read-write module 67 is configured to receive a read request sent from the host code, read data from the first storage resource according to the request, and forward the data back to the host code. Read-write module 67 is also configured to receive a write request sent from the host code, write data to the first storage resource according to the request, and synchronize the written data to the first video memory on the first video memory resource.

In an embodiment, mapping module 66 is specifically configured to conduct a paging process to the virtual memory to obtain a memory page, conduct a paging process to the video memory resource to obtain a video memory page, and generate the mapping relation between the memory page and the video memory page.

Read-write module 67, based on the foregoing, can be specifically configured to receive a write request sent from the host code to write data to the first storage resource, determine the first memory page where the data is written to, and synchronize the data on the first memory page to the video page corresponding to the first memory.

In an embodiment, allocating module 62 is configured to determine the sequencing to allocate computational resources for the device code according to the priorities of allocation requests. It is also used to allocate the first computational resource for the device code from the computational resources and the first video memory resource for the device code from the video memory resources according to the mapping logic mapping the available hardware resource of at least one GPU to the unified virtual GPU resource.

In another embodiment, sending module 63 is configured to send the identifier information of the first computational resource and address information of the first storage resource to the host code to enable the host code to send the device code to the first computational resource to have the first computational resource run the device code and save the data produced in running the device code to the first storage resource and to the mark first video memory resource as allocated.

The resource management device of the embodiment can be located between the GPU and the application program maintaining the mapping logic (mapping the available hardware resource of at least one GPU to the unified virtual GPU resource) to enable the available hardware resources of at least one GPU to be presented to the application program as the unified virtual GPU resource. The specific process is to allocate resources for the device code running on the GPU of the application program. In this way, there is a separation between the application program and the details of the low level GPU hardware so that the application program does not need to take the low level hardware details into account or determine how to allocate GPU resources. The logic of the running process of the device code can then be designed to be used by a single GPU. There is no need to consider having the interactive functions between multiple GPUs. The application programs advantageously do not need to be redesigned to meet the requirements to adapt to the combination of one computer with multiple GPUs, which thereby allows GPU resources to be effectively used and reduce costs.

Those skilled in the art should appreciate that the specific working process(es) of the systems, devices, and methods in the foregoing can be referred to in the embodiments of the present disclosure, which will not be fully discussed herein.

According to the embodiments of the present disclosure, it should be noted that the systems, devices, and methods can be embodied in other ways. The devices described above are just schematic. For example, the arrangement of the modules is just an arrangement of the function logic; there are other arrangements that will fulfill the requirements. For example, one or multiple modules or units can be combined or loaded to another system while omitting some features or procedures. Moreover, the coupling and combination discussed can be embodied by indirect couplings or communication connections between some ports, devices, or modules; the indirect couplings or communication connections can be electrical, mechanical, or in other forms.

The modules described as separate parts in the descriptions can be physically separated or connected; the modules presented as parts of the device can be or may not be physical modules, meaning that they can be located at the same location or scattered to multiple network units. The processes and devices in the embodiments of the present disclosure can be selected in part or in whole to fulfill the target function of the present disclosure.

Moreover, the function modules in the embodiments of the present disclosure can be integrated into one processing unit or can be scattered to separate physical units; they can also be implemented by combining two or more function modules. The integrated unit can be embodied in the form of hardware or a combination of hardware and software.

The integrated unit embodied in the form of software can be stored on a computer-readable storage medium containing several commands to enable a computer (including PCs, servers, or network devices) or a processor to execute part of the steps in the embodiments of the present disclosure. The computer-readable mediums include the following: USB drives, portable hard drives, read-only memories, random access memories, magnetic disks or CDs, and all mediums that can store program codes.

It should be noted that, although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A method of resource management, the method comprising:
    obtaining a plurality of available first video memory addresses from a plurality of graphics processing units (GPUs);
    associating the plurality of available first video memory addresses from the plurality of GPUs with a plurality of second video memory addresses such that a second video memory address has a corresponding available first video memory address, the second video memory address identifying a memory location that stores the corresponding available first video memory address;
    receiving an allocation request to use a GPU to execute a device code that interacts with device data, the allocation request being sent from a host code of an application program and including a requested amount of video memory;
    allocating a number of second video memory addresses from the plurality of second video memory addresses in response to the allocation request to provide the requested amount of video memory; and
    responsive to the allocating, forwarding information about the number of second video memory addresses back to the host code of the application program.

2. The method of claim 1, wherein obtaining a plurality of available first video memory addresses includes:
    sending a request to obtain resource details to each one of the GPUs of the plurality of GPUs;
    receiving resource details of each one of the GPUs forwarded back from each one of the GPUs in response to the request to obtain resource details, the resource details describing the available hardware resources of each one of the GPUs; and
    associating the plurality of available first video memory addresses from the plurality of GPUs with a plurality of second video memory addresses in response to the resource details of each one of the GPUs.

3. The method of claim 1, wherein the memory location is within a system memory.

4. A method of resource management, the method comprising:
    applying, in accordance with mapping logic, from a system memory, for a virtual memory providing a total amount of virtual memory resources analogous to the total amount of available video memory resources of an at least one GPU;
    generating a mapping relation between the virtual memory and the available video memory resources provided by the at least one GPU;
    receiving an allocation request to allocate resources sent from a host code of an application program located on a first device;
    allocating, in accordance with the allocation request and a maintained mapping logic that maps available hardware resources of the at least one GPU of the first device to a unified virtual GPU resource, resources for a device code of the application program from the available hardware resources of the at least one GPU of the first device, the available hardware resources of the at least one GPU including video memory resources and computational resources, the allocating including:
        reading, in accordance with the allocation request, the mapping logic; and
        allocating, in accordance with the mapping logic, a first computational resource for the device code from the computational resources and a first video memory resource for the device code from the video memory resources, the allocating the first video memory resource including:
   allocating a first storage resource for the device code from the virtual memory; and
   marking, according to the mapping relation, the first video memory resource corresponding to the first storage resource to identify the first video memory resource allocated to the device code; and
responsive to the allocating, forwarding information of allocated resources back to the host code of the application program.

5. The method of claim 4, further comprising:
receiving a read request sent from the host code to read data from the first storage resource and forwarding the data read back to the host code; and
receiving a write request sent from the host code to write data to the first storage resource and synchronizing the marked first video memory resource with the data written.

6. The method of claim 4, wherein the mapping relation between the virtual memory and the available video memory resource of the at least one GPU is generated through a process comprising:
conducting paging to the virtual memory to obtain a memory page;
conducting paging to the video memory resource to obtain a video memory page;
generating a mapping relation between the memory page and the video memory page; and
wherein the synchronizing the first video memory resource to the data written further comprises:
determining the first memory page where the data is written and
synchronizing the data on the first memory page to the video memory page corresponding to that first memory page.

7. The method of claim 4, further comprising:
receiving a plurality of allocation requests, and determining a sequencing of allocating computational resources according to priorities of the plurality of allocation requests; and
allocating a computational resource in accordance with the sequencing and the mapping logic.

8. The method of claim 4, wherein forwarding information further includes:
sending information of the first computational resource and information of the first video memory resource to the host code to enable the host code to send the device code to the first computational resource to have the first computational resource run the device code, and save the data produced by running the device code to the first video memory resource; and
reading the data produced in running the device code from the first video memory resource.

9. A method for resource management, the method comprising:
obtaining resource details about a plurality of graphics processing units (GPU)s, the resource details including a plurality of GPU memory resources;
applying to a system memory to obtain space to host a virtual memory, the virtual memory having a plurality of virtual memory resources that correspond with the plurality of GPU memory resources;
mapping the virtual memory resources to the GPU memory resources;
receiving an allocation request to allocate resources sent from a host code of an application program;
allocating a first virtual memory resource from the virtual memory resources, the first virtual memory resource being sized to accommodate a device code of the application program; and
marking the first video memory resource that corresponds to the first virtual memory resource to identify the first video memory resource as being allocated to the device code.

10. The method of claim 9, wherein obtaining resource details includes:
sending a request to obtain resource details of each one of the GPUs of the plurality of GPUs; and
receiving resource details about each of the GPUs forwarded back from each of the GPUs in response to the request, the resource details describing available hardware resources of each one of the GPUs.

11. The method of claim 9, further comprising transmitting information about the first virtual memory resource back to the host code of the application program.

12. An apparatus for resource management, the apparatus comprising:
a non-transitory computer-readable medium;
a processor coupled to the non-transitory computer-readable medium to execute instructions stored on the medium to:
   manage, in accordance with a mapping logic, a virtual memory providing a total amount of virtual video memory resources analogous to the total amount of available video memory resources that an at least one GPU provides from a system memory of a first device;
   generate a mapping relation between the virtual memory and the available video memory resources provided by the at least one GPU;
   receive an allocation request to allocate a resource sent from a host code of an application program on the first device;
   allocate, in accordance with the allocation request and a maintained mapping logic that maps hardware resources of the at least one GPU on the first device to a unified virtual GPU, resources for running a device code of the application program from the hardware resources of the at least one GPU on the first device, the hardware resources of the at least one GPU including video memory resources and computational resources, the instructions to allocate including:
      reading the mapping logic according to the allocation request;
      allocating, in accordance with the mapping logic, a first computational resource for the device code from the computational resources, and allocating a first video memory resource for the device code from the video memory resources, the allocating the first video memory source including:
      allocating a first storage resource for the device code from the virtual memory, and
      labeling, in accordance with the mapping logic, the first video memory resource corresponding to the first storage resource to identify the first video memory resource allocated for the device code; and
   forward information of the allocated resources back to the host code of the application program.

13. The apparatus of claim 12, wherein the processor further executes instructions to:
  receive a reading request sent from the host code to read data from the first storage resource and forwarding the data read back to the host code; and
  receive a writing request sent from the host code to write data to the first storage resource and synchronizing the first video memory resource with the data written according to the label of the first video memory resource.

14. The apparatus of claim 12, wherein the processor further executes instructions to:
  conduct paging to the virtual memory to obtain a virtual memory page;
  conduct paging to the video memory resource to obtain a video memory page;
  generate a mapping relation between the virtual memory page and the video memory page; and
  receive a request to write sent from the host code to write data to the first storage resource, determine a first memory page where the data is written, and synchronize the video memory page corresponding to the first memory page with the data in the first memory page.

15. The apparatus of claim 12, wherein the processor further executes instructions to:
  receive a plurality of allocation requests, and determine a sequencing of allocating the computational resources according to respective priorities of the plurality of allocation requests, and
  allocate, according to the sequencing and the mapping logic, a computational resource and a memory resource.

16. The apparatus of claim 12, wherein to forward information the processor further executes instructions to:
  send information of the first computational resource and information of the first video memory resource to the host code to enable the host code to send the device code to the first computational resource to have the first computational resource run the device code, and save the data produced in running the device code to the first video memory resource; and
  read the data produced in running the device code from the first video memory resource.

17. A non-transitory computer-readable medium that stores a plurality of instructions that, when executed by a processor, implement a method comprising:
  obtaining resource details about a plurality of graphics processing units (GPU)s, the resource details including a plurality of GPU memory resources;
  applying to a system memory to obtain space to host a virtual memory, the virtual memory having a plurality of virtual memory resources that correspond with the plurality of GPU memory resources;
  mapping the virtual memory resources to the GPU memory resources;
  receiving an allocation request to allocate resources sent from a host code of an application program;
  allocating a first virtual memory resource from the virtual memory resources, the first virtual memory resource being sized to accommodate a device code of the application program;
  responsive to the allocating, forwarding information about the first virtual memory resource back to the host code of the application program; and
  marking the first video memory resource that corresponds to the first virtual memory resource to identify the first video memory resource as being allocated to the device code.

18. The medium of claim 17, wherein obtaining resource details includes:
  sending a request to obtain resource details to each one of the GPUs of the plurality of GPUs; and
  receiving resource details about each one of the GPUs forwarded back from each one of the GPUs in response to the request to obtain resource details, the resource details describing the available hardware resources of each one of the GPUs.

19. The medium of claim 17, wherein the resource details further include a plurality of GPU computational resources.

20. The medium of claim 17, wherein obtaining resource details includes receiving a registration request sent from each GPU of the plurality of GPUs, the registration request including resource details.

* * * * *